(12) United States Patent
Motomura et al.

(10) Patent No.: US 10,413,856 B2
(45) Date of Patent: Sep. 17, 2019

(54) STACKED BODY

(71) Applicant: Panasonic Intellectual Property Management Co., Ltd., Osaka (JP)

(72) Inventors: Koji Motomura, Osaka (JP); Hiroto Sumida, Nara (JP); Takahiko Murata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 140 days.

(21) Appl. No.: 15/695,389

(22) Filed: Sep. 5, 2017

(65) Prior Publication Data

US 2018/0085698 A1    Mar. 29, 2018

(30) Foreign Application Priority Data

Sep. 28, 2016 (JP) ................. 2016-190111

(51) Int. Cl.
| | |
|---|---|
| *B01D 53/02* | (2006.01) |
| *B01D 46/00* | (2006.01) |
| *B01D 39/16* | (2006.01) |
| *B01D 39/18* | (2006.01) |
| *B01D 46/52* | (2006.01) |

(52) U.S. Cl.
CPC ..... *B01D 46/0036* (2013.01); *B01D 39/1623* (2013.01); *B01D 39/18* (2013.01); *B01D 46/0032* (2013.01); *B01D 46/521* (2013.01); *B01D 2239/0241* (2013.01); *B01D 2239/1233* (2013.01); *B01D 2275/10* (2013.01)

(58) Field of Classification Search
CPC .... B01D 2239/0241; B01D 2239/1233; B01D 2275/10; B01D 39/1623; B01D 39/18; B01D 46/0032; B01D 46/0036; B01D 46/521

See application file for complete search history.

(56) References Cited

U.S. PATENT DOCUMENTS

| | | | |
|---|---|---|---|
| 5,807,366 A  * | 9/1998 | Milani | ............... A61F 13/15658 604/358 |
| 2003/0207635 A1 | 11/2003 | Minemura et al. | |
| 2007/0059618 A1* | 3/2007 | Kurimoto | .............. G03G 5/047 430/58.5 |
| 2009/0266048 A1 | 10/2009 | Schwarz | |
| 2013/0037481 A1 | 2/2013 | Lalouch et al. | |
| 2018/0085697 A1* | 3/2018 | Piry | .................. B01D 46/0028 |

FOREIGN PATENT DOCUMENTS

| | | |
|---|---|---|
| JP | 2000-024426 A | 1/2000 |
| JP | 2002-248309 A | 9/2002 |
| JP | 2004-000852 A | 1/2004 |
| JP | 2009-190269 A | 8/2009 |
| JP | 2011-202662 A | 10/2011 |
| JP | 2013-528711 A | 7/2013 |

\* cited by examiner

*Primary Examiner* — Christopher P Jones
(74) *Attorney, Agent, or Firm* — Pearne & Gordon LLP

(57) ABSTRACT

There is provided a stacked body which includes a porous base layer, a porous charged layer, a very fine-fiber layer, and an adsorbent. The base layer is configured with base fiber. The charged layer is configured with charged fiber. The very fine-fiber layer is interposed between the base layer and the charged layer and includes very fine fiber. The adsorbent is held in the very fine fiber and adsorbs a chemical substance. An average fiber diameter of the charged fiber is greater than an average fiber diameter of the very fine fiber.

7 Claims, 4 Drawing Sheets

STACKED BODY

BACKGROUND

1. Technical Field

The present disclosure relates to a stacked body and to a stacked body used, for example, as a filter material of an air cleaner.

2. Description of the Related Art

Recently, a function of adsorbing chemical substances in the air in addition to a function of dust collection is required for a filter material used in an air cleaner or the like. In particular, formaldehyde acts as a cause substance of a sick house syndrome and also causes social issues. PTL 1 and PTL 2 disclose a filter in which an adsorbent that adsorbs a chemical substance is dispersed in a space between a base layer and a surface layer.

In PTL 1 and PTL 2, the adsorbent is mixed with a hot melt adhesive and then the mixture is sprinkled on the base layer. In this case, since the surface of the adsorbent is covered with the hot melt adhesive, the function of the adsorbent is not sufficiently exhibited. Meanwhile, if the adhesive is not used, the adsorbent is fallen. Thus, PTL 3 discloses that the adsorbent is caused to be held in short fiber and a sheet is formed by using the short fiber. Accordingly, the surface of the adsorbent is not covered with the hot melt adhesive, and the function of the adsorbent is exhibited.

CITATION LIST

Patent Literature

PTL 1: Japanese Patent Unexamined Publication No. 2002-248309
PTL 2: Japanese Patent Unexamined Publication No. 2009-190269
PTL 3: Japanese Patent Unexamined Publication No. 2004-852

SUMMARY

There is provided a stacked body which includes a porous base layer, a porous charged layer, a very fine-fiber layer, and an adsorbent. The base layer is configured with base fiber. The charged layer is configured with charged fiber. The very fine-fiber layer is interposed between the base layer and the charged layer and includes very fine fiber. The adsorbent is held in the very fine fiber and adsorbs a chemical substance. An average fiber diameter of the charged fiber is greater than an average fiber diameter of the very fine fiber.

DETAILED DESCRIPTIONS

Figure 1:
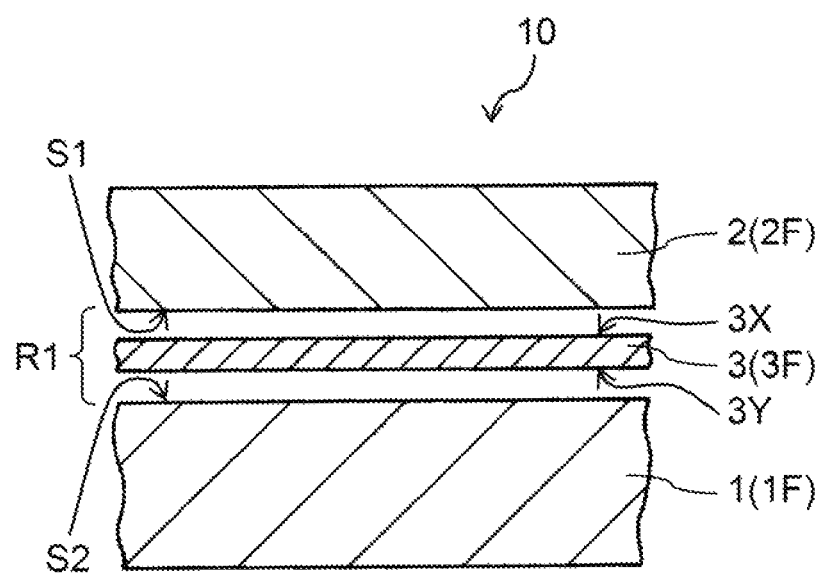
FIG. 1 is a schematic diagram illustrating a section of a stacked body according to an exemplary embodiment.

A sheet disclosed in PTL 3 is disposed in order to adsorb a chemical substance, but does not have a purpose of improving dust collection performance. Therefore, in a case where it is desired to achieve dust collection and adsorption of a chemical substance, a filter for dust collection is further required. Thus, a configuration becomes complicated and cost is increased.

A stacked body according to an exemplary embodiment includes a porous base layer, a charged layer which is porous and is charged, and a very fine-fiber layer which is interposed between the base layer and the charged layer, and includes very fine fiber. The base layer functions as a base material that holds the shape of the stacked body. The charged layer has a function of capturing relatively large dust by using an electrostatic force and functions as a protective material that protects the very fine-fiber layer from various external loads. The very fine-fiber layer includes very fine fiber having an average fiber diameter which is smaller than or equal to 3 μm, and thus can capture finer dust. In a case where the stacked body is used as a filter material, a fluid is caused to pass through the stacked body from the charged layer toward the base layer. Since large dust is captured by the charged layer, the function of the very fine-fiber layer, that is, the function of capturing finer dust is sufficiently exhibited.

The stacked body further includes an adsorbent that adsorbs a chemical substance. The adsorbent is held in the very fine fiber. Being held in the very fine fiber means that the adsorbent is in contact with at least the very fine fiber. Since the very fine fiber has a large surface area, the adsorbent can come into contact with the very fine fiber at many contact points. Thus, it is difficult to fall the adsorbent.

The adsorbent is concentrated on the vicinity of an interface of the very fine-fiber layer with the charged layer. That is, when region R from a first intermediate surface of the charged layer, which faces the very fine-fiber layer to a second intermediate surface of the base layer, which faces the very fine-fiber layer is assumed, in this region R, mass (density A1) (per unit area) of the adsorbent held in very fine fiber 3F on the first intermediate surface side is greater than mass (density A2) (per unit area) of the adsorbent held in very fine fiber 3F on the second intermediate surface side. That is, the density of the adsorbent on a surface of the very fine-fiber layer, which faces the charged layer is greater than the density of the adsorbent on a surface of the very fine-fiber layer, which faces the base layer. Thus, the large amount of the adsorbent is captured by an electrostatic force which acts in a space between the very fine-fiber layer and the charged layer, and stays in the vicinity of the interface of the very fine-fiber layer with the charged layer. Accordingly, an occurrence of falling the adsorbent is suppressed for a long term.

As described above, the charged layer and the very fine fiber act on the concentrated adsorbent, and thus the occurrence of falling the adsorbent is suppressed. Here, the charged layer and the very fine-fiber layer have dust collection performance. That is, in the exemplary embodiment, the charged layer and the very fine-fiber layer have the dust collection performance and have a function of causing the adsorbent to stay in the stacked body (in particular, the vicinity of the interface of the very fine-fiber layer on the charged layer side). Accordingly, with a simple configuration in which a special configuration requirement for holding the adsorbent is not added, it is possible to efficiently suppress the occurrence of falling the adsorbent.

Hereinafter, regarding the stacked body according to the exemplary embodiment, a form suitable for a filter material of an air cleaner will be specifically described with reference to the drawings. However, the application of the stacked body according to the embodiment is not limited thereto. FIG. 1 is a sectional view schematically illustrating stacked body 10 according to the exemplary embodiment. Stacked body 10 includes porous base layer 1, charged layer 2, very fine-fiber layer 3, and adsorbent 4 (see FIGS. 2 and 3). Charged layer 2 is porous and is charged. Very fine-fiber layer 3 is interposed between base layer 1 and charged layer 2 and includes very fine fiber 3F (see FIGS. 2 and 3). Adsorbent 4 adsorbs a chemical substance. In the exemplary embodiment, adsorbent 4b, adsorbent 4f, adsorbent 4n, and the like are collectively referred to as adsorbent 4. For convenience, in FIG. 1, layers are illustrated to be separate from each other. However, in practice, the layers are adhered to each other.

Base Layer

Base layer 1 is porous and has a function of holding the shape of stacked body 10. For example, in a case where stacked body 10 is pleated, the shape of pleats is held by base layer 1.

The form and the material of base layer 1 may be appropriately selected in accordance with the purpose of a use. Specifically, fibrous structures such as fabric, a knitted work, and nonwoven fabric can be exemplified as base layer 1. Among the fibrous structures, in a case where stacked body 10 is used as a filter material, base layer 1 is preferably nonwoven fabric from a viewpoint of pressure loss. The nonwoven fabric is manufactured, for example, by a spunbond method, a dry type method (for example, air laid method), a wet type method, a melt blowing method, a needle punching method, or the like. Base layer 1 is preferably nonwoven fabric manufactured by the wet type method among the methods.

In a case where base layer 1 is nonwoven fabric, the material of base fiber 1F constituting base layer 1 is not particularly limited. Examples of the material of base fiber 1F include glass fiber, cellulose, acrylic resin, polypropylene (PP), polyethylene (PE), polyester (for example, polyethylene terephthalate (PET) and polybutylene terephthalate), polyamide (PA), and mixtures thereof. Among the materials, from a point of being suitable as a shape holding material, the material of base fiber 1F is preferably PET or cellulose. In particular, it is preferable that base layer 1 includes PET and/or cellulose at a proportion which is greater than or equal to 80 mass %. Average fiber diameter D1 of base fiber 1F is not particularly limited. For example, average fiber diameter D1 thereof may be greater than or equal to 1 µm and smaller than or equal to 40 µm and be greater than or equal to 5 µm and smaller than or equal to 20 µm.

Average fiber diameter D1 refers to an average value of diameters of strands of base fiber 1F. The diameter of base fiber 1F refers to a diameter of a section perpendicular to a length direction of base fiber 1F. In a case where such a section is not circular, the greatest diameter may be considered as the diameter. The width of base fiber 1F in a direction perpendicular to the length direction thereof when base layer 1 is viewed from a normal direction of one main surface may be considered as the diameter of base fiber 1F. Average fiber diameter D1 is, for example, an average value of diameters of any 10 strands of base fiber 1F included in base layer 1, at a certain place. The above descriptions are also applied to average fiber diameters D2 and D3 which will be described later.

Thickness T1 of base layer 1 is not particularly limited. For example, thickness T1 thereof may be greater than or equal to 50µm and smaller than or equal to 500µm and be greater than or equal to 150µm and smaller than or equal to 400µm. Thickness T of base layer 1 refers to an average value of thickness of base layer 1 at any 10 places, for example. The thickness refers to a distance between two main surfaces of base layer 1. In a case where base layer 1 is nonwoven fabric, the thickness of base layer 1 is obtained as follows. A picture of a section of the nonwoven fabric is taken. When a line perpendicular to one main surface is drawn from any one point on the one main surface of the nonwoven fabric to the other main surface to be shortest, an outside distance (outward dimension) between two strands of fiber which are at positions farthest from each other among strands of fiber on the line is obtained. The thickness of the nonwoven fabric is calculated by applying the similar manner to other any plural points (for example, 9 points). A numerical value obtained by averaging the values obtained as the thickness is set as the thickness of the nonwoven fabric. When the thickness is calculated, a binarized image may be used. The above descriptions are also applied to thicknesses T2 and T3 which will be described later.

The mass of base layer 1 per unit area is not particularly limited. For example, the mass of base layer 1 per unit area may be greater than or equal to 10 $g/m^2$ and smaller than or equal to 80 $g/m^2$, and be greater than or equal to 35 $g/m^2$ and smaller than or equal to 60 $g/m^2$. The pressure loss of base layer 1 is not particularly limited. Regarding the pressure loss thereof, initial pressure loss of base layer 1 is preferably about greater than or equal to 1 Pa and smaller than or equal to 10 Pa in a case of being measured by using a measuring device which is based on the standard of JISB9908 Format 1. If the initial pressure loss of base layer 1 is in the range, the pressure loss of the entirety of stacked body 10 is also suppressed.

The porosity of base layer 1 is not particularly limited. From a viewpoint of the pressure loss, the porosity thereof is preferably greater than or equal to 65 volume % and smaller than or equal to 98 volume %. The porosity (volume %) of base layer 1 is represented, for example, by an expression of (1−(apparent mass of base layer 1 per unit volume)/specific gravity of base fiber 1F)×100.

Charged Layer

Charged layer 2 is porous and is charged (permanently charged). That is, charged layer 2 semi-permanently holds electric polarization in a state where an external electric field is not provided, and forms an electric field around the periphery of charged layer 2. Therefore, dust is captured to charged layer 2 by an electrostatic force generated between the dust and charged layer 2. Charged layer 2 may also function as a protective material for protecting very fine-fiber layer 3 from various external loads.

The form and the material of charged layer 2 may be appropriately selected in accordance with the purpose of a use. Similarly to base layer 1, fibrous structures can be exemplified as charged layer 2. Among these structures, from a viewpoint of the pressure loss, it is preferable that charged layer 2 is nonwoven fabric. In a case where charged layer 2 is nonwoven fabric, the material of charged fiber 2F constituting charged layer 2 is not particularly limited. The material of charged fiber 2F may be the same as that of base fiber 1F. Among the materials, from a point of easy charging and easy maintaining of the electrostatic property, polypropylene (PP) is preferable. In a case where charged layer 2 is nonwoven fabric, a manufacturing method thereof is not particularly limited, and the methods exemplified for base layer 1 can be exemplified. Among the methods, from a point of easy formation of nonwoven fabric which is suitable for a filter material and has a small fiber diameter, charged layer 2 is preferably manufactured by the melt blowing method.

Average fiber diameter D2 of charged fiber 2F is greater than average fiber diameter D3 of very fine fiber 3F which will be described later (D2>D3). Average fiber diameter D2 thereof is smaller than average fiber diameter D1 of base fiber 1F (D2<D1). Average fiber diameter D2 is, for example, greater than or equal to 0.5μm and smaller than or equal to 20μm and preferably greater than or equal to 5μm and smaller than or equal to 20μm.

The pressure loss of charged layer 2 is not particularly limited. Regarding the pressure loss thereof, initial pressure loss of charged layer 2 is preferably about 1 to 10 Pa in a case of being measured by using a measuring device which is based on the standard of JISB9908 Format 1. If the initial pressure loss of charged layer 2 is in the range, the pressure loss of the entirety of stacked body 10 is also suppressed.

Thickness T2 of charged layer 2 is preferably greater than or equal to 100μm and smaller than or equal to 500μm, and more preferably greater than or equal to 150μm and smaller than or equal to 400μm, from a viewpoint of the pressure loss. From a viewpoint of the pressure loss, the mass of charged layer 2 per unit area is preferably greater than or equal to 10 g/m$^2$ and smaller than or equal to 50 g/m$^2$, and more preferably greater than or equal to 10 g/m$^2$ and smaller than or equal to 30 g/m$^2$.

A method of charging charged layer 2 is not particularly limited, and known charging methods may be used. Examples of the charging method include a corona discharge method, a pure-water suction method, and a triboelectric charging method. A timing at which charging is performed is not particularly limited. For example, charging may be performed simultaneously with spinning of charged fiber 2F constituting charged layer 2. In a case where charged fiber 2F is manufactured by being extended, charging may be performed while being extended. After charged layer 2 is formed, charging may be performed. A surface potential of charged layer 2 (potential difference between charged layer 2 which has been charged and charged layer 2 which has not been charged) is not particularly limited. For example, the surface potential thereof may be greater than or equal to 5 kV and smaller than or equal to 100 kV.

The porosity of charged layer 2 is not particularly limited. From a viewpoint of the pressure loss, the porosity thereof is preferably greater than or equal to 60 volume % and smaller than or equal to 95 volume %, and more preferably greater than or equal to 70 volume % and smaller than or equal to 90 volume %. From a viewpoint of preventing the occurrence of falling the adsorbent, the porosity of charged layer 2 is preferably smaller than the porosity of base layer 1.

Very Fine-fiber Layer

Very fine-fiber layer 3 is interposed between base layer 1 and charged layer 2 and includes very fine fiber 3F. Average fiber diameter D3 of very fine fiber 3F is smaller than or equal to or 3 μm. Average fiber diameter D3 is preferably smaller than or equal to 1 μm, and more preferably smaller than or equal to 500 nm. Average fiber diameter D3 is preferably greater than or equal to 50 nm and more preferably greater than or equal to 100 nm. Such very fine-fiber layer 3 is formed in a manner that very fine fiber 3F is deposited on base layer 1 by using an electrospinning method, for example. From a viewpoint of dust collection performance, average fiber diameter D3 is preferably smaller than or equal to 1/10 of average fiber diameter D1, and is preferably greater than or equal to 1/2000 of average fiber diameter D1. Average fiber diameter D3 is preferably smaller than or equal to 1/3 of average fiber diameter D2, and is preferably greater than or equal to 1/100 of average fiber diameter D2.

Average mass of very fine fiber 3F per unit area is preferably greater than or equal to 0.01 g/m$^2$ and smaller than or equal to 1.5 g/m$^2$, more preferably greater than or equal to 0.01 g/m$^2$ and smaller than or equal to 0.5 g/m$^2$, and particularly preferably greater than or equal to 0.03 g/m$^2$ and smaller than or equal to 0.1 g/m$^2$. If the mass of very fine fiber 3F is in the above range, high dust collection efficiency is easily exhibited while the pressure loss is suppressed. Thickness T3 of very fine-fiber layer 3 is preferably greater than or equal to 0.5 μm and smaller than or equal to 10 μm, and more preferably greater than or equal to 1 μm and smaller than or equal to 5 μm, from a viewpoint of the pressure loss.

The material of very fine fiber 3F is not particularly limited. For example, polymers as follows are exemplified: PA, polyimide (PI), polyamideimide (PAI), polyether imide (PEI), polyacetal (POM), polycarbonate (PC), polyether ether ketone (PEEK), polysulfone (PSF), polyethersulfone (PES), polyphenylene sulfide (PPS), polytetrafluoroethylene (PTFE), polyarylate (PAR), polyacrylonitrile (PAN), polyvinylidene fluoride (PVDF), polyvinyl alcohol (PVA), polyvinyl acetate (PVAc), polypropylene (PP), polyethylene terephthalate (PET), and polyurethane (PU). The above substances may be used singly or be used in combination which is greater than or equal to two kinds thereof. Among the substances, in a case where very fine fiber 3F is formed by an electrospinning method, PES is preferably used. From a point of easily reducing average fiber diameter D2, PVDF is preferably used.

Adsorbent

Adsorbent 4 is held in very fine fiber 3F. Adsorbent 4 is not particularly limited. For example, substances which can adsorb at least one of volatile organic compounds (VOC) such as formaldehyde, acetaldehyde, toluene, xylene, and ethyl acetate are exemplified. Specifically, an organic material such as adipic acid dihydrazide, activated carbon, zeolite, and the like are exemplified as adsorbent 4.

The amount of provided adsorbent 4 is not particularly limited. From a viewpoint of the adsorption performance and the pressure loss, the amount of provided adsorbent 4 is preferably 0.1 to 30 g/m$^2$, more preferably 0.5 to 20 g/m$^2$, and particularly preferably 1 to 10 g/m$^2$.

Adsorbent 4 is held in very fine fiber 3F, in a particulate form. An average particle size of particles in adsorbent 4 is not particularly limited. For example, the average particle size is preferably greater than or equal to 0.1 μm and more preferably greater than or equal to 1 μm. The average particle size of the particles in the adsorbent is preferably smaller than or equal to 1000 μm, more preferably smaller than or equal to 400 μm, further preferably smaller than or equal to 200 μm, and particularly preferably smaller than or equal to 100 μm. The average particle size refers to an average value of the greatest diameters of 10 particles of adsorbent 4 when very fine-fiber layer 3 including adsorbent 4 is viewed from a normal direction of one main surface. This is also similarly applied to a case of the average particle size of an adhesive which will be described later. Adsorbent 4 having an average particle size in the above range may pass through a gap between strands of base fiber 1F constituting base layer 1. However, the large amount of adsorbent 4 is disposed in the vicinity of an interface of very fine-fiber layer 3, on an opposite side of base layer 1. Thus, an occurrence of a situation in which adsorbent 4 passes through base layer 1 and then is fallen from stacked body 10 is suppressed.

Adsorbent 4 is held in very fine fiber 3F, but distribution thereof is not uniform. A peak in the distribution of adsorbent 4 may be provided in the vicinity of an interface of very fine-fiber layer 3 with charged layer 2. In other words, in region R from first intermediate surface S1 of charged layer 2, which faces very fine-fiber layer 3 to second intermediate surface S2 of base layer 1, which faces very fine-fiber layer 3, density A1 of adsorbent 4 on first intermediate surface S1 side is greater than density A2 of adsorbent 4 of second intermediate surface side. That is, the density of adsorbent 4 on a surface of very fine-fiber layer 3, which faces charged layer 2 is greater than the density of adsorbent 4 on a surface of very fine-fiber layer 3, which faces base layer 1.

Figure 2:
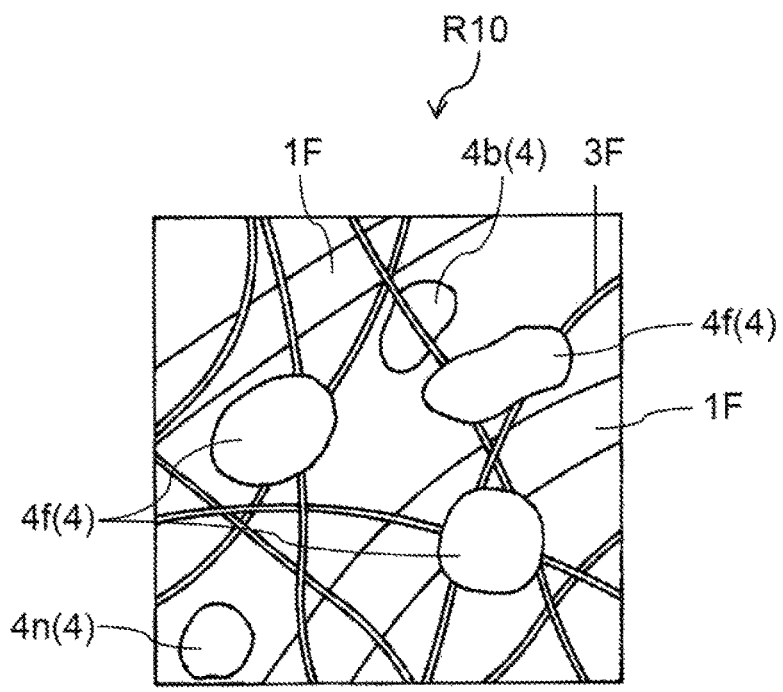
FIG. 2 is a schematic diagram illustrating a top surface of a complex obtained by peeling a charged layer off from the stacked body.
Figure 3:
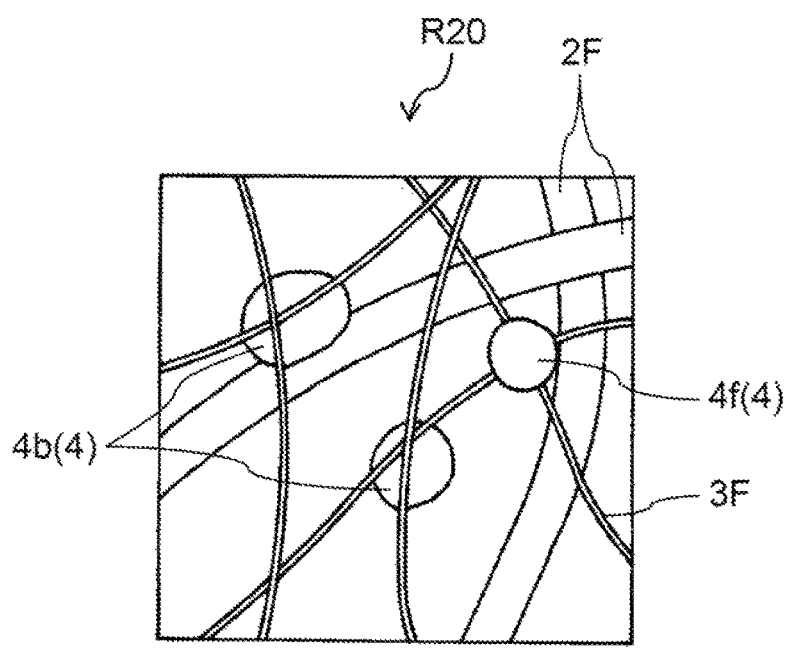
FIG. 3 is a schematic diagram illustrating a top surface of a complex obtained by peeling a base layer off from the stacked body.

Density A1 and density A2 of adsorbent 4 can be replaced with, for example, area proportions of adsorbent 4, which are calculated based on a scanning electron microscopic (SEM) image of the main surface of very fine-fiber layer 3, as illustrated in FIGS. 2 and 3. That is, in a case where area proportion Rf1 of adsorbent 4 provided in the vicinity of first main surface 3X which is an interface of very fine-fiber layer 3 with charged layer 2 is greater than area proportion Rf2 of adsorbent 4 provided in the vicinity of second main surface 3Y which is an interface of very fine-fiber layer 3 with base layer 1 on an opposite side, it is considered that adsorbent 4 is concentrated on the vicinity of the interface of very fine-fiber layer 3 with charged layer 2.

FIG. 2 is a top view schematically illustrating a form when complex A obtained by peeling charged layer 2 off from stacked body 10 is viewed from a normal direction of first main surface 3X of very fine-fiber layer 3. Base fiber 1F is provided in the back of very fine fiber 3F. FIG. 2 schematically illustrates region R10 of complex A, which is used for calculating area proportion Rf1 of the provided adsorbent.

FIG. 3 is a top view schematically illustrating a form when complex B obtained by peeling base layer 1 off from stacked body 10 is viewed from a normal direction of second main surface 3Y of very fine-fiber layer 3. Charged fiber 2F is provided in the back of very fine fiber 3F. FIG. 3 schematically illustrates region R20 of complex B, which is used for calculating area proportion Rf2 of the provided adsorbent.

Area proportion Rf1 of adsorbent 4, which replaces density A1 is obtained in a manner as follows, for example. Firstly, only charged layer 2 is peeled off from stacked body 10. At this time, it is assumed that adsorbent 4 is not peeled along with charged layer 2. Charged layer 2 may be peeled while stacked body 10 is heated. Square region R10 having one side which corresponds to a length of about 7 times average fiber diameter D1 of base fiber 1F is determined from obtained complex A of base layer 1 and very fine-fiber layer 3. The entirety of region R10 is observed by SEM from the normal direction of first main surface 3X of very fine-fiber layer 3. Then, a proportion of region R10 to the total area of adsorbent 4 is calculated. At this time, an adsorbent other than adsorbent 4b (see FIG. 2) in the back of very fine fiber 3F, that is, adsorbent 4n which does not overlap very fine fiber 3F and adsorbent 4f which overlaps very fine fiber 3F but is in the front of very fine fiber 3F are picked up. Thus, the area proportion is calculated. In addition, other 9 regions (R11 to R19) having the same area as that of region R10 are determined from complex A. Then, regarding the determined regions, the area proportion of adsorbent 4 (4f and 4n) is also calculated in a similar manner. An average value of the area proportions in 10 regions R10 to R19 is set to be area proportion Rf1 of adsorbent 4. In regions R10 to R19, adsorbent 4 may be provided more in the front of very fine fiber 3F.

Area proportion Rf2 of adsorbent 4, which replaces density A2 can be calculated in a manner similar to the above descriptions. Firstly, only base layer 1 is peeled off from stacked body 10. At this time, it is assumed that adsorbent 4 is not peeled along with base layer 1. Square region R20 having one side which corresponds to a length of about 7 times average fiber diameter D1 of base fiber 1F is determined from obtained complex B of charged layer 2 and very fine-fiber layer 3. The entirety of region R20 is observed by SEM from the normal direction of second main surface 3Y of the very fine-fiber layer 3. Then, a proportion of region R20 to the total area of adsorbent 4 is calculated. Even in this case, an adsorbent other than adsorbent 4b in the back of very fine fiber 3F, that is, adsorbent 4n which does not overlap very fine fiber 3F and adsorbent 4f which overlaps very fine fiber 3F but is in the front of very fine fiber 3F are picked up. Thus, the area proportion is calculated. In addition, other 9 regions (R21 to R29) having the same area as that of region R20 are determined from complex B. Then, regarding the determined regions, the area proportion of adsorbent 4 (4f and 4n) is also calculated in a similar manner. An average value of the area proportions in 10 regions R20 to R29 is set to be area proportion Rf2 of adsorbent 4. In regions R20 to R29, adsorbent 4 may be provided more in the back of very fine fiber 3F.

In a case where it is difficult to peel only base layer 1 off from stacked body 10, regions R10 to R19 in complex A, which are obtained by peeling only charged layer 2 off may be observed by SEM in the normal direction of first main surface 3X of very fine-fiber layer 3, and area proportion Rf2 may be calculated. In this case, adsorbent 4b in the back of very fine fiber 3F and adsorbent 4n which does not overlap very fine fiber 3F are picked up, and area proportion Rf2 is calculated.

Figure 4A:
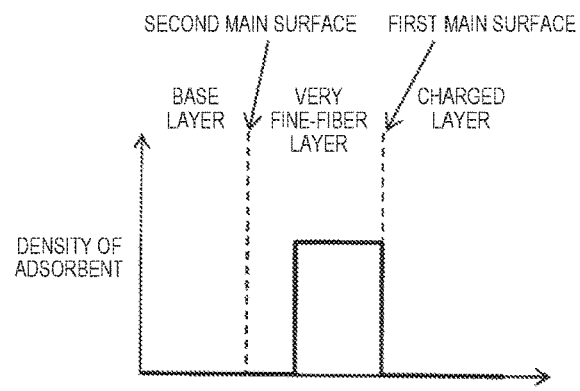
FIG. 4A is a graph illustrating an example of distribution of an adsorbent according to the exemplary embodiment.
Figure 4B:
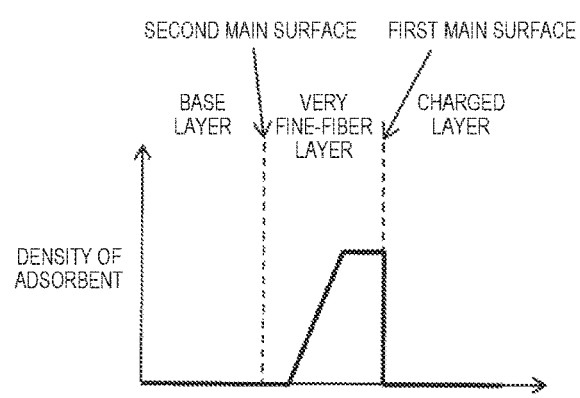
FIG. 4B is a graph illustrating another example of distribution of an adsorbent according to the exemplary embodiment.
Figure 4C:
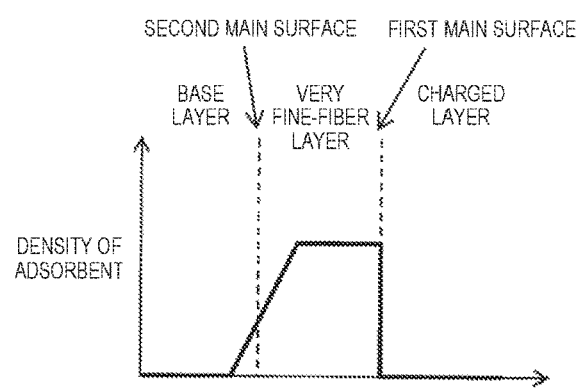
FIG. 4C is a graph illustrating still another example of distribution of an adsorbent according to the exemplary embodiment.
Figure 4D:
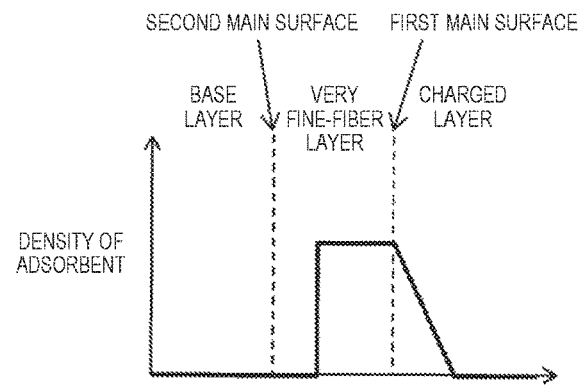
FIG. 4D is a graph illustrating still another example of distribution of an adsorbent according to the exemplary embodiment.

Adsorbent 4 may be held in base fiber 1F and charged fiber 2F in addition to very fine fiber 3F so long as the peak in the distribution of adsorbent 4 is provided in the vicinity of the interface of very fine-fiber layer 3 with charged layer 2. FIGS. 4A to 4D illustrate examples of the distribution of adsorbent 4 in stacked body 10. In FIGS. 4A to 4D, a vertical axis indicates the density of adsorbent 4. FIGS. 4A and 4B illustrate a case where adsorbent 4 is held only in very fine fiber 3F. FIG. 4A illustrates a case where a peak in the distribution of adsorbent 4 is provided in the vicinity of first main surface 3X, and adsorbent 4 is uniformly held in the vicinity of first main surface 3X. FIG. 4B illustrates a case where the density of adsorbent 4 is gradually increased toward first main surface 3X. FIG. 4C illustrates a case where a portion of adsorbent 4 is held in base fiber 1F. FIG. 4D illustrates a case where a portion of adsorbent 4 is held in charged fiber 2F.

Stacked body 10 may be, for example, pleated so as to have a bellows shape and be disposed as a filter material in an air cleaner. In this case, from a point of dust collection efficiency, it is preferable that stacked body 10 is disposed between an inlet and an outlet so as to position charged layer 2 on the inlet side for an air.

Manufacturing Method of Stacked Body

A manufacturing method of stacked body 10 according to the exemplary embodiment will be described below by using, as an example, a case where very fine fiber 3F is deposited on base layer 1 by an electrospinning method.

For example, stacked body 10 can be obtained by a manufacturing method which includes (1) a process of preparing a base layer, (2) a process of forming a very fine-fiber layer on one surface of the base layer by depositing the very fine fiber with an electrospinning method, (3) a process of sprinkling an adsorbent on the very fine-fiber layer, (4) a process of stacking a charged layer on the very fine-fiber layer after the adsorbent is sprinkled.

The above-described manufacturing method of the stacked body can be performed by a manufacturing system, for example. In the manufacturing system, the base layer is transported from an upstream of the line toward a downstream thereof. The very fine-fiber layer is formed on the main surface of the transported base layer, and the adsorbent is sprinkled. Then, the charged layer is stacked. Such a manufacturing system includes, for example, (1) a base layer feeding unit that feeds a base layer to a transport belt, (2) an electrospinning unit that includes an electrospinning mechanism of generating very fine fiber from a raw material liquid by an electrostatic force and depositing the generated very fine fiber on the base layer in the middle of being transported, (3) an adsorbent sprinkling unit that sprinkles an adsorbent from a very fine-fiber layer side of a complex of the base layer sent from the electrospinning unit and the very fine-fiber layer, and (4) a charged layer stacking unit that stacks a charged layer from the very fine-fiber layer side of the complex sent from the adsorbent sprinkling unit, so as to interpose the adsorbent.

Figure 5:
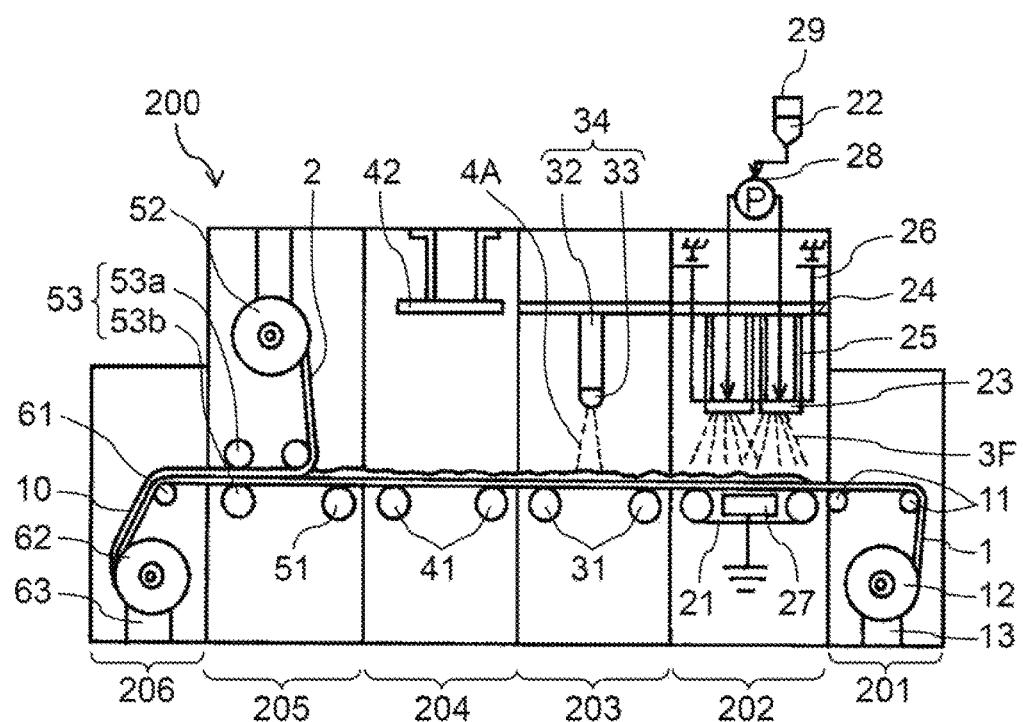
FIG. 5 is a diagram illustrating a configuration example of a manufacturing system used when the stacked body according to the exemplary embodiment is manufactured.

In the following descriptions, a manufacturing method of a stacked body and a manufacturing system that performs the method will be described with reference to FIG. 5. However, the embodiment is not limited to the following system and manufacturing method. FIG. 5 is a schematic diagram illustrating a configuration of an example of manufacturing system 200 of stacked body 10. Manufacturing system 200 constitutes a manufacturing line for manufacturing stacked body 10.

Firstly, base layer 1 is prepared. In manufacturing system 200, base layer 1 is transported from an upstream side of the manufacturing line toward a downstream thereof. Base layer feeding unit 201 that accommodates base layer 1 which is wound to have a roll shape is provided in the most upstream of manufacturing system 200. Base layer feeding unit 201 rotates supply reel 12 by motor 13 so as to feed base layer 1 which is wound around supply reel 12 to transport roller 11.

Base layer 1 is transported to electrospinning unit 202 by transport roller 11. Electrospinning mechanism included in electrospinning unit 202 includes discharging member 23, charging means (see descriptions which will be made later), and transport conveyor 21. Discharging member 23 is installed at an upper portion of the unit and is used for discharging raw material liquid 22 of very fine fiber 3F. The charging means charges discharged raw material liquid 22 so as to have a positive polarity. Transport conveyor 21 transports base layer 1 which is disposed to oppose discharging member 23, from an upstream side to downstream side. Transport conveyor 21 functions as a collector unit that collects very fine fiber 3F along with base layer 1. The number of electrospinning units 202 is not particularly limited. One or two or more electrospinning units may be provided.

In a case where plurality of electrospinning units 202 and/or discharging members 23 is provided, average fiber diameter D3 of formed very fine fiber 3F may be changed for each of electrospinning units 202 or each of discharging members 23. Average fiber diameter D3 of very fine fiber 3F can be changed by adjusting discharge pressure of raw material liquid 22, an applied voltage, concentration of the raw material liquid, a distance between the discharging member 23 and base layer 1, a temperature, humidity, and the like.

A discharging port (not illustrated) of raw material liquid 22 is provided at a plurality of places on a side of discharging member 23, which faces the main surface of base layer 1. A distance between the discharging port of discharging member 23 and base layer 1 depends on the size of electrospinning unit 202 or a desired fiber diameter. For example, the distance may be 100 to 600 mm. Discharging member 23 is supported by second support 25 so as to cause a longitudinal direction of discharging member 23 to be parallel to the main surface of base layer 1. Second support 25 is installed at the upper portion of electrospinning unit 202 and is extended downwardly from first support 24 which is provided to be parallel to a transporting direction of base layer 1. First support 24 may move to cause discharging member 23 to slide in a direction perpendicular to the transporting direction of base layer 1.

The charging means includes voltage applying device 26 that applies a voltage to discharging member 23, and counterpart electrode 27 which is installed to be parallel to transport conveyor 21. Counterpart electrode 27 is grounded. Thus, a potential difference (for example, 20 to 200 kV) depending on a voltage which is applied by voltage applying device 26 can be provided between discharging member 23 and counterpart electrode 27. The configuration of the charging means is not particularly limited. For example, counterpart electrode 27 may be charged to have a negative polarity. Instead of providing counterpart electrode 27, a belt portion of transport conveyor 21 may be configured from a conductor.

Discharging member 23 is configured with a conductor and has an elongated shape. Discharging member 23 is hollow. A hollow portion functions as an accommodation portion that accommodates raw material liquid 22. Raw material liquid 22 is supplied to the hollow of discharging member 23 from raw material liquid tank 29 by pressure of pump 28 which communicates with hollow portion of discharging member 23. Raw material liquid 22 is discharged from the discharging port toward the main surface of base layer 1 by the pressure of pump 28. Discharged raw material liquid 22 causes electrostatic explosion, in a charged state while discharged raw material liquid 22 moves in a space (generation space) between discharging member 23 and base layer 1, and thus generates a fibrous matter (very fine fiber 3F). Generated very fine fiber 3F is deposited on base layer 1, and thus a very fine-fiber layer 3 having a nonwoven fabric shape is formed. The amount of deposited very fine fiber 3F is controlled by adjusting discharge pressure of raw material liquid 22, an applied voltage, concentration of raw material liquid 22, a transporting speed of base layer 1, and the like.

A solvent included in raw material liquid 22 may be suitably selected in accordance with the type of raw material resin or a manufacturing condition. For example, the followings can be used: methanol, ethanol, 1-propanol, 2-propanol, hexafluoroisopropanol, tetraethylene glycol, triethylene glycol, dibenzyl alcohol, 1,3-dioxolane, 1,4-dioxane, methyl ethyl ketone, methyl isobutyl ketone, methyl-n-hexyl ketone, methyl-n-propyl ketone, diisopropyl ketone, diisobutyl ketone, acetone, hexafluoroacetone, phenol, formic acid, methyl formate, ethyl formate, propyl formate, methyl benzoate, ethyl benzoate, propyl benzoate, methyl acetate, ethyl acetate, propyl acetate, dimethyl phthalate, diethyl phthalate, dipropyl phthalate, methyl chloride, ethyl chloride, methylene chloride, chloroform, o-chlorotoluene, p-chlorotoluene, carbon tetrachloride, 1,1-dichloroethane, 1,2-dichloroethane, trichloroethane, dichloropropane, dibromoethane, dibromopropane, methyl bromide, ethyl bromide, propyl bromide, acetic acid, benzene, toluene, hexane, cyclohexane, cyclohexanone, cyclopentane, o-xylene, p-xylene, m-xylene, acetonitrile, tetrahydrofuran, N,N-dimethylformamide, N,N-dimethylacetamide (DMAc), dimethyl sulfoxide, pyridine, and water. The oxides may be singly used or be used in combination of plural kinds thereof. Among the substances, DMAc is preferable from a point of being suitable for the electrospinning method and from a point of easily dissolving PES in a case where very fine fiber 3F including PES is formed by the electrospinning method.

An inorganic solid material may be added to raw material liquid 22. Examples of the inorganic solid material can include oxide, carbide, nitride, boride, silicide, fluoride, and sulfide. Among the substances, from a viewpoint of workability, oxide is preferably used. Examples of the oxide can include $Al_2O_3$, $SiO_2$, $TiO_2$, $Li_2O$, $Na_2O$, MgO, CaO, SrO, BaO, $B_2O_3$, $P_2O_5$, $SnO_2$, $ZrO_2$, $K_2O$, $Cs_2O$, ZnO, $Sb_2O_3$, $As_2O_3$, $CeO_2$, $V_2O_5$, $Cr_2O_3$, MnO, $Fe_2O_3$, CoO, NiO, $Y_2O_3$, $Lu_2O_3$, $Yb_2O_3$, $HfO_2$, and $Nb_2O_5$. The oxides may be singly used or be used in combination of plural kinds thereof.

A mixing ratio of a solvent and raw material resin in raw material liquid 22 varies depending on the type of the selected solvent and the type of the selected raw material resin. A proportion of the solvent in raw material liquid 22 is, for example, from 60 mass % to 95 mass %.

The electrospinning mechanism that forms very fine fiber 3F is not limited to the above-described configuration. Any electrospinning mechanism can be used without being particularly limited, so long as the mechanism can generate very fine fiber 3F from raw material liquid 22 by an electrostatic force and deposit generated very fine fiber 3F on the main surface of base layer 1 in a predetermined generation space of very fine fiber 3F. For example, the shape of a section which is perpendicular to the longitudinal direction of discharging member 23 may be a shape (V type nozzle) having the size which is gradually reduced from an upper portion thereof toward a lower portion.

After the very fine-fiber layer 3 is formed, a complex of base layer 1 and very fine-fiber layer 3 is transported to adsorbent sprinkling unit 203. In adsorbent sprinkling unit 203, an adsorbent liquid (collectively referred to as adsorbent liquid 4A below), for example, a dispersion of adsorbent 4, a solution of adsorbent 4, or an adsorbent liquid in which a portion of adsorbent 4 is dissolved and the remainder is dispersed is sprinkled from the upper portion of the complex. A sprinkling method is not particularly limited. For example, the adsorbent liquid is sprinkled by a spray method, free fall, sieve fall, or the like. Adsorbent sprinkling unit 203 includes sprinkling device 34. Sprinkling device 34 includes adsorbent tank 32 and sprinkling member 33. Adsorbent tank 32 is installed at an upper portion of adsorbent sprinkling unit 203 and accommodates adsorbent liquid 4A. Sprinkling member 33 is used for sprinkling adsorbent liquid 4A.

After adsorbent liquid 4A is sprinkled, an adhesive may be sprinkled on the complex. The adhesive is sprinkled from very fine-fiber layer 3 side of the complex. The particulate adhesive is sprinkled, for example, by a spray method, free fall, or the like. Adsorbent liquid 4A and the adhesive may be simultaneously sprinkled. In this case, adhesive particles may be mixed in adsorbent liquid 4A, and the mixture may be sprinkled.

An average particle size of adhesive particles is not particularly limited. For example, the average particle size may be greater than or equal to 100 μm and smaller than or equal to 500 μm, and be greater than or equal to 100 μm and smaller than or equal to 400 μm. The average particle size of the adhesive is generally greater than the average particle size of adsorbent 4. Therefore, the process of sprinkling the adhesive particles is preferably performed after adsorbent liquid 4A is sprinkled or simultaneously with sprinkling of adsorbent liquid 4A. The reason is because adsorbent 4 is easily held in very fine fiber 3F without disturbing the adhesive. The adhesive may be applied so as to have a line shape.

The type of the adhesive is not particularly limited. For example, a hot melt adhesive which has thermoplastic resin as the main component is exemplified. Examples of the thermoplastic resin can include polyester such as PU and PET, PA, and polyolefin (for example, PP and PE). The amount of the provided adhesive is not particularly limited. From a viewpoint of adhesion properties, the amount of the provided adhesive is preferably greater than or equal to 0.5 $g/m^2$ and smaller than or equal to 15 $g/m^2$, more preferably greater than or equal to 1 $g/m^2$ and smaller than or equal to 10 $g/m^2$, and particularly preferably greater than or equal to 3 $g/m^2$ and smaller than or equal to 9 $g/m^2$.

After the adsorbent is sprinkled and before charged layer 2 is stacked on the complex, the solvent included in very fine fiber 3F, the dispersion medium of adsorbent liquid 4A, and the like are removed by heating unit 204 which includes heating device 42. Heating device 42 is not particularly limited and known devices may be appropriately selected. A heating temperature may be appropriately selected in accordance with a boiling point of each solvent or the dispersion medium. For example, heating may be performed so as to cause the temperature of the surface of base layer 1 to be about 100° C. to 200° C.

Then, the complex is transported to charged layer stacking unit 205. In charged layer stacking unit 205, charged layer 2 is fed from the very fine-fiber layer 3 side of the complex and is stacked on the complex via the adsorbent and the adhesive. In a case where charged layer 2 is long, similar to base layer 1, charged layer 2 may be wound around second supply reel 52. In this case, charged layer 2 is stacked on the complex while being unwound from second supply reel 52.

After charged layer 2 is stacked, stacked body 10 may be pressed while pressure is applied to stacked body 10 by a pair of pressing rollers 53 (53a and 53b) disposed up and down with stacked body 10 interposed therebetween, and thus the complex and charged layer 2 may be more adhered to each other.

Finally, stacked body 10 is carried out from charged layer stacking unit 205 and is transported to collecting unit 206 which is disposed on a downstream side of charged layer stacking unit 205, via roller 61. Collecting unit 206 has collecting reel 62 mounted therein, for example. Collecting reel 62 causes transported stacked body 10 to be wound. Collecting reel 62 is rotated and driven by motor 63.

According to the disclosure, with a simple configuration, a stacked body in which dust collection and adsorption of a chemical substance can be performed and the occurrence of falling an adsorbent can be suppressed for a long term is obtained.

According to the stacked body in the disclosure, the occurrence of falling an adsorbent is suppressed. Thus, the stacked body is suitable as a filter material of an air cleaner or an air conditioner, a separation sheet for a battery, a membrane for a fuel cell, an external examination sheet such as a pregnancy examination sheet, a medical sheet for cell culture, a dustproof cloth such as a dustproof mask or dustproof clothing, a cosmetic sheet, a wiping sheet that wipes off dust, or the like.

What is claimed is:

1. A stacked body comprising:
   a porous base layer which is configured with base fiber;
   a porous charged layer which is configured with charged fiber;
   a very fine-fiber layer which is interposed between the base layer and the charged layer and includes very fine fiber; and
   an adsorbent which is held in the very fine fiber and adsorbs a chemical substance,
   wherein an average fiber diameter of the charged fiber is greater than an average fiber diameter of the very fine fiber, and
   wherein the average fiber diameter of the charged fiber is smaller than an average fiber diameter of the base fiber.

2. The stacked body of claim 1,
   wherein the average fiber diameter of the very fine fiber is greater than or equal to $\frac{1}{2000}$ and smaller than or equal to $\frac{1}{10}$ of the average fiber diameter of the base fiber.

3. The stacked body of claim 1,
   wherein the average fiber diameter of the very fine fiber is greater than or equal to $\frac{1}{100}$ and smaller than or equal to $\frac{1}{3}$ of the average fiber diameter of the charged fiber.

4. The stacked body of claim 1,
   wherein the average fiber diameter of the very fine fiber is greater than or equal to 50 nm and smaller than or equal to 3 μm.

5. The stacked body of claim 1,
   wherein the average fiber diameter of the charged fiber is greater than or equal to 0.5 μm and smaller than or equal to 20 μm.

6. The stacked body of claim 1,
   wherein density of the adsorbent on a surface, which faces the charged layer, of the very fine-fiber layer is greater than density of the adsorbent on a surface, which faces the base layer, of the very fine-fiber layer.

7. The stacked body of claim 1,
   wherein, in a region from a first intermediate surface, which faces the very fine-fiber layer, of the charged layer, to a second intermediate surface, which faces the very fine-fiber layer, of the base layer,
   density of the adsorbent on a side of the first intermediate surface is greater than density of the adsorbent on a side of the second intermediate surface.

\* \* \* \* \*